(12) United States Patent
Hasei et al.

(10) Patent No.: US 8,562,238 B2
(45) Date of Patent: Oct. 22, 2013

(54) PIPE HANDLE HOLDING MECHANISM

(75) Inventors: Shoji Hasei, Wako (JP); Mai Ohba, Wako (JP); Katsuhisa Ichikawa, Wako (JP); Kouhei Okaguchi, Wako (JP)

(73) Assignee: Honda Motor Co., Ltd., Tokyo (JP)

( * ) Notice: Subject to any disclaimer, the term of this patent is extended or adjusted under 35 U.S.C. 154(b) by 399 days.

(21) Appl. No.: 12/628,539

(22) Filed: Dec. 1, 2009

(65) Prior Publication Data

US 2010/0132163 A1 Jun. 3, 2010

(30) Foreign Application Priority Data

Dec. 3, 2008 (JP) ................................. 2008-308948
May 21, 2009 (JP) ................................. 2009-123355

(51) Int. Cl.
*F16B 7/08* (2006.01)

(52) U.S. Cl.
USPC ........... 403/235; 403/234; 403/385; 403/386; 403/389; 403/396

(58) Field of Classification Search
USPC ............. 403/96, 97, 385, 386, 388, 389–391, 403/394–396, 400, 234, 235; 285/369, 419, 285/373, 420; 248/62, 74.1, 229.1, 229.2
See application file for complete search history.

(56) References Cited

U.S. PATENT DOCUMENTS

| | | | | |
|---|---|---|---|---|
| 369,971 A | * | 9/1887 | Stillman | 403/97 |
| 1,631,831 A | * | 6/1927 | Palmer-Jones | 403/97 |
| 1,706,215 A | * | 3/1929 | Davidson | 403/97 |
| 3,126,191 A | * | 3/1964 | Holden | 403/97 |
| 3,128,073 A | * | 4/1964 | Berlyn | 248/55 |
| 4,875,651 A | * | 10/1989 | Wergin et al. | 248/291.1 |
| 6,056,668 A | * | 5/2000 | Nagashima | 403/97 |
| 6,536,982 B2 | * | 3/2003 | Gibbons et al. | 403/97 |
| 6,701,623 B2 | * | 3/2004 | Sanders | 30/276 |
| 7,179,010 B2 | * | 2/2007 | Weger et al. | 403/289 |
| 7,377,472 B2 | * | 5/2008 | Brown et al. | 248/74.1 |
| 7,814,994 B2 | * | 10/2010 | Franzen | 175/220 |
| 2002/0040953 A1 | * | 4/2002 | Linnenbuerger | 248/74.1 |
| 2005/0006535 A1 | * | 1/2005 | Brown et al. | 248/70 |
| 2008/0079235 A1 | | 4/2008 | Chao | |
| 2012/0079911 A1 | * | 4/2012 | Hon et al. | 74/551.3 |

FOREIGN PATENT DOCUMENTS

| | | |
|---|---|---|
| DE | 2961662 | 11/1996 |
| JP | 55-157088 | 11/1980 |
| JP | 2002-218813 | 8/2002 |
| JP | 3132313 | 6/2007 |
| JP | 2008-11740 | 1/2008 |

* cited by examiner

*Primary Examiner* — Victor MacArthur
(74) *Attorney, Agent, or Firm* — Rankin, Hill & Clark LLP

(57) ABSTRACT

A pipe handle holding structure wherein force for holding a bar handle in a holder is minimized, the holding performance whereby the bar handle is held by the holder is improved, and the bar handle and holder are maintained in an appropriate state even in cases in which the bar handle is frequently attached to and detached from the holder. The pipe handle holding structure comprises a round pipe-shaped bar handle, and a holder for holding an external peripheral surface of the bar handle. The holder has a plurality of concealing parts for concealing the external peripheral surface of the bar handle and elastically deforming the external peripheral surface in a pipe diameter direction.

4 Claims, 9 Drawing Sheets

PIPE HANDLE HOLDING MECHANISM

FIELD OF THE INVENTION

The present invention relates to a pipe handle holding mechanism wherein a round pipe-shaped bar handle used in, e.g., a weed cutter or another work machine is held by a holder.

BACKGROUND OF THE INVENTION

A structure in which a bar handle is fixed to a chassis by bolting or welding is commonly used in, e.g., weed cutters and other work machines. Recently, a technique for detachably mounting the bar handle to the chassis has often been used to accomplish this, and one example of this technique is a pipe handle holding structure. The pipe handle holding structure is often used in work machines that are operated by an operator grasping the bar handle. Weed cutters which use this type of pipe handle holding structure are known as disclosed, e.g., in Japanese Patent Application Laid-Open Publication No. 2002-218813 (JP 2002-218813 A).

In the pipe handle holding structure disclosed in JP 2002-218813 A, an external peripheral surface of a round pipe-shaped bar handle is held by a holder. In other words, the bar handle is held by a holder provided to a chassis of a work machine. To be more specific, the holder is comprised of a pair of halved parts. The divided parts have respective grooves for covering the external peripheral surface of the round pipe-shaped bar handle. The bar handle is fitted into the grooves and the holder halves are assembled and fastened together, whereby the holder halves hold the external peripheral surface of the bar handle therebetween. Thus, the bar handle is held by the holder, using the friction force between the internal peripheral surfaces of the grooves and the external peripheral surface of the bar handle.

In this type of pipe handle holding structure described above, a large fastening force is needed to ensure that the bar handle does not slip in the holder. Therefore, a tool is used to firmly fasten the fastening bolts. This is sufficient in cases in which the bar handle is attached to and detached from the holder infrequently.

However, in cases in which the bar handle is attached to and detached from the holder frequently, the attaching/detaching operation is troublesome and has room for improvement. One example of a case of frequent attaching and detaching the bar handle to and from the holder is a case of changing the angle at which the bar handle is held on the holder along with a change in the work specifications of the work machine. Another example is a case in which the angle at which the bar handle is held on the holder is changed between a usage state and a storage state of the work machine.

To prevent slipping between the holder and the bar handle, it has been proposed that serrations or other irregularities be provided to both the internal peripheral surfaces of the grooves of the holder and the external peripheral surface of the bar handle. Because of this assembled structure using irregularities, a small fastening force from the fastening bolts is sufficient. However, in cases in which the bar handle is attached to and detached from the holder frequently, there is further room for improvement in order to ensure that the irregularities will be durable.

SUMMARY OF THE INVENTION

It is therefore an object of the present invention to provide a pipe handle holding structure whereby the holding capability with which a bar handle is held by a holder can be improved, and the bar handle and holder can be maintained in an appropriate state even when the bar handle is frequently attached to and detached from the holder, while the force for holding the bar handle in the holder is minimized.

According to an aspect of the present invention, there is provided a pipe handle holding structure, which comprises a round pipe-shaped bar handle and a holder for holding an external peripheral surface of the bar handle, wherein the holder has a plurality of enclosing parts for enclosing the external peripheral surface of the bar handle and causing the bar handle to elastically deform in a pipe diameter direction.

In the pipe handle holding structure of the present invention, the external peripheral surface of the round pipe-shaped bar handle is enclosed and made to elastically deform in the pipe diameter direction by the enclosing parts. When the external peripheral surface of the bar handle is enclosed by the enclosing parts, the round pipe-shaped bar handle deforms into a somewhat distorted shape (hereinbelow referred to as "an elastically deformed state") in accordance with the enclosing force. When the enclosing is then released, the round pipe-shaped bar handle returns to its original shape. While the round pipe-shaped bar handle remains in the elastically deformed state, the elastically deformed portions in the external peripheral surface of the bar handle can be maintained in an enclosed state by the enclosing parts. Therefore, the external peripheral surface of the bar handle does not slip in relation to the enclosing parts. As a result, the bar handle can be constantly and reliably held by the holder; therefore, the holding performance of the holder can be improved, and a reliable hold can be sufficiently maintained.

In conventional pipe handle holding structures, a large fastening force has been required for the external peripheral surface of the bar handle to be held by friction force against the inside surface of the holder.

In response to this, in the present embodiment, the external peripheral surface of the bar handle is enclosed and made to elastically deform in the pipe diameter direction by the enclosing parts, and a comparatively small force is therefore sufficient for holding the bar handle in the holder.

Furthermore, since the external peripheral surface of the bar handle is enclosed and made to elastically deform in the pipe diameter direction by the enclosing parts, the bar handle and holder can be constantly maintained in an appropriate state even if the bar handle is frequently attached to and detached from the holder.

It is preferred that the holder be divided into two holder halves, the holder halves have respective grooves recessed from opposed surfaces thereof in directions opposite the opposed surfaces, the grooves form a single through-hole when the holder halves are joined together, the through-hole constitute a handle insertion hole through which the bar handle passes, the enclosing parts be positioned on an internal peripheral surface of the handle insertion hole at predetermined intervals in an internal peripheral direction, and the bar handle be elastically deformed in the pipe diameter direction in accordance with the fastening force when the joined holder halves are manually fastened by a knobbed fastening member.

Thus, the holder is configured from a pair of holder halves. The holder halves have grooves recessed in directions opposite opposing surfaces which face each other. When the holder halves are joined together, the grooves face each other. Causing the grooves to face each other causes a through-hole (a handle insertion hole through which the bar handle passes) to be formed in the holder. The enclosing parts are positioned on the internal peripheral surface of the through-hole at predetermined intervals along the internal peripheral direction. The bar handle passing through the through-hole is enclosed by the enclosing parts. In other words, when the joined holder halves are manually fastened by the knobbed fastening member, the external peripheral surface of the bar handle is enclosed by the enclosing parts. As a result, the enclosing parts can cause the bar handle to elastically deform in the pipe diameter direction in accordance with the fastening force of the fastening member. Thus, the bar handle can be reliably held by a holder having a simple configuration merely in which respective grooves are formed in a pair of holder halves.

Preferably, the internal peripheral surface of the handle insertion hole includes pipe-outward-deformation allowing parts at portions where the enclosing parts are not positioned, the pipe-outward-deformation allowing parts being formed to allow unenclosed portions of the bar handle to elastically deform diametrically outward when the bar handle is enclosed by the enclosing parts and elastically deforms radially inwardly of the pipe.

Thus, in the present invention, the remaining portions of the internal peripheral surface of the handle insertion hole where the enclosing parts are not positioned constitute parts that allow deformation in the outward direction of the pipe.

Commonly, the circumferential length of the pipe does not change from its original length prior to deformation even when the bar handle elastically deforms radially inwardly of the pipe. Therefore, in cases in which the bar handle is enclosed by the enclosing parts and is made to elastically deform radially inwardly of the pipe, the portion not enclosed acts as though to expand radially outwardly of the pipe. In other words, this portion acts as though to elastically deform (protrude) farther radially outwardly of the pipe than the internal peripheral surface of the handle insertion hole.

In response to this, in the present embodiment, the internal peripheral surface of the handle insertion hole is provided with the parts that allow deformation in the outward direction of the pipe so as to allow for the portions acting as though to protrude farther diametrically outward than the internal peripheral surface of the handle insertion hole. Therefore, the portion not enclosed by the enclosing parts is not restricted by the handle insertion hole and can protrude radially outwardly of the pipe. Consequently, the bar handle can be enclosed by the enclosing parts and can be more easily made to elastically deform radially outwardly of the pipe.

It is preferred that the holder be comprised of a pair of holder halves that has been divided into two halves, the holder halves have respective cross-sectionally tapered grooves which taper in directions opposite opposing surfaces which face each other, the grooves form a single through-hole when the holder halves are mated together, the through-hole constitute a handle insertion hole through which the bar handle passes, respective inclined groove surfaces for forming the grooves constitute the enclosing parts, and the enclosing parts be formed so as to elastically deform the bar handle in the pipe diameter direction in accordance with the fastening force when the joined pair of holder halves is manually fastened by a knobbed fastening member.

Thus, the holder is configured from a pair of holder halves that has been divided into two halves. The holder halves have grooves substantially tapered in cross section; i.e., substantially V-shaped grooves which taper in directions opposite from the opposing surfaces facing each other. The inclined groove surfaces for forming these grooves constitute a plurality of concealing parts. The substantially V-shaped grooves face each other when the holder halves are joined together. Causing these grooves to face each other forms a substantially square through-hole (the handle insertion hole through which the bar handle passes) in the holder. The bar handle passing through the through-hole is enclosed by the four sides (enclosing parts) in the cross-sectionally square-shaped through-hole. In other words, when the joined holder halves are manually fastened together by the knobbed fastening member, the external peripheral surface of the bar handle is enclosed by the enclosing parts at four points along the pipe circumferential direction. As a result, the four enclosing parts can cause the bar handle to elastically deform in the pipe diameter direction in accordance with the fastening force of the locking bolt. Thus, the bar handle can be reliably held by a holder having a simple configuration merely in which grooves having substantially tapered shapes in cross section are formed respectively on the pair of holder halves.

It is preferred that the pair of holder halves be configured so that in a state in which the external peripheral surface of the bar handle is enclosed, the opposing surfaces are separated from each other by a gap, one set of ends are linked to each other by a hinge mechanism, and the other set of ends are linked together by the knobbed fastening member; that the knobbed fastening member be comprised of a bolt having a knob on a head, one of the pair of holder halves have a bearing surface pressed toward the other of the pair of holder halves by a pressing surface in the head, the bearing surface be configured as an inclined surface in relation to the pressing surface in a state in which the external peripheral surface of the bar handle is enclosed by the pair of holder halves, and the inclined surface be configured so as to be inclined so as to approach the pressing surface as the inclined surface moves away from the hinge mechanism.

Thus, the one set of ends of the holder halves are linked by the hinge mechanism. Therefore, one of the holder halves is capable of swinging in relation to the other holder half, the swinging proximal end being the one end linked by the hinge mechanism. The other set of ends of the holder halves are linked by the knobbed fastening member (a bolt having a knob at the head). When the bolt is fastened in a state in which the external peripheral surface of the bar handle is enclosed by the pair of holder halves, the pressing surface of the head presses the bearing surface in the one holder half toward the other holder half. At this time, the balance of force in the one holder half can be said to be the same as the balance of force in a so-called cantilever. A "second distance," which is the distance from one end linked by the hinge mechanism to a position (the center of the bolt) pressed by the pressing surface of the head, is greater than a "first distance," which is the distance from the aforementioned end to a position where the external peripheral surface of the bar handle is enclosed. Therefore, the force whereby the external peripheral surface of the bar handle is enclosed by the holder halves is strong even if the force whereby the bolt is fastened is small. In other words, a comparatively small force is sufficient for turning the knob in order to cause the external peripheral surface of the bar handle to be enclosed by the enclosing parts and elastically deformed in the pipe diameter direction. Therefore, the operator's load can be reduced.

Furthermore, the bearing surface is inclined so as to approach the pressing surface as it moves away from the hinge mechanism. Therefore, the position where the pressing surface of the head presses on the bearing surface is even farther away from the hinge mechanism. The distance from the center of the bolt to the position where the pressing surface of the head presses the bearing surface is a "third distance." The distance from the aforementioned end to the position pressed by the pressing surface of the head is even greater, being equivalent to the "second distance" and the "third distance" combined. Consequently, an even smaller force is sufficient for turning the knob, and the operator's load can therefore be further reduced.

It is preferred that the bar handle and the holder be composed of an aluminum alloy or another lightweight alloy. Therefore, a small force is sufficient for elastically deforming the bar handle by a predetermined amount in the pipe diameter direction, in comparison with cases in which a steel bar handle is used. Furthermore, since the pipe handle holding structure has a configuration in which the external peripheral surface of the bar handle is enclosed by the enclosing parts and made to elastically deform in the pipe diameter direction, the structure is considerably more durable than a conventional pipe handle holding structure which uses friction force or a pipe handle holding structure provided with serrations or other irregularities, regardless of whether or not the bar handle and the holder are created from an aluminum alloy or another lightweight alloy in order to reduce weight.

BRIEF DESCRIPTION OF THE DRAWINGS

Certain preferred embodiments of the present invention will be described in detail below, by way of example only, with reference to the accompanying drawings, in which.

DESCRIPTION OF THE PREFERRED EMBODIMENTS

For an example of the pipe handle holding structure put to use, the present embodiment presents an example in which the pipe handle holding structure is used in a weed or bush cutter.

Figure 1:
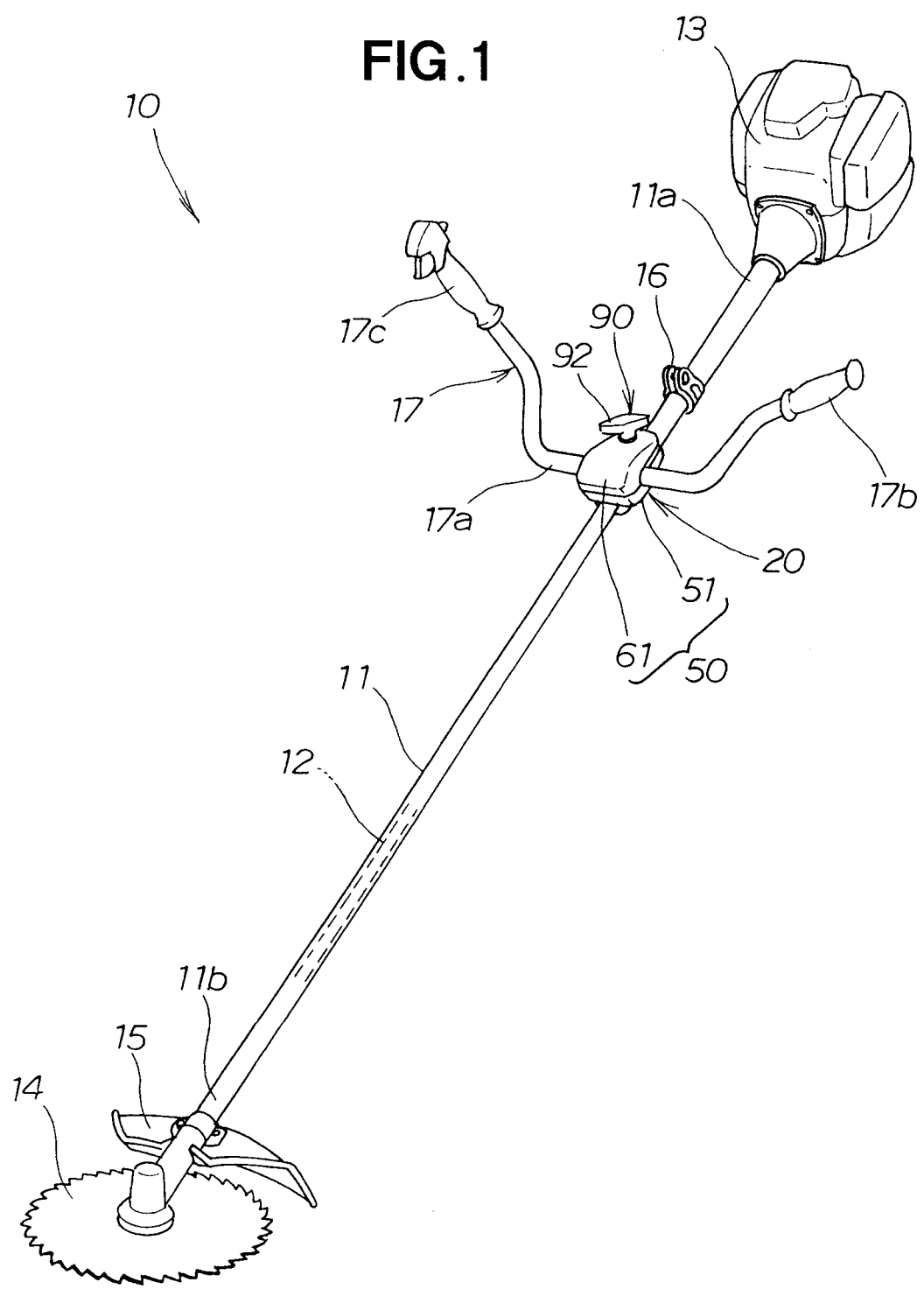
FIG. 1 is a perspective view of a weed cutter that uses a pipe handle holding structure according to the present invention.

In a weed cutter 10 shown in FIG. 1, a rotating shaft 12 is passed through a round pipe-shaped operating rod 11, and the rotating shaft 12 is driven by a prime mover 13 provided to one end 11a of the operating rod 11, thereby causing a cutting blade 14 provided to the other end 11b of the operating rod 11 to rotate. The prime mover 13 is an engine. The operating rod 11 comprises a cover 15 for covering the rear half of the cutting blade 14, a shoulder strap hook 16, and a bar handle 17. A shoulder strap for carrying the weed cutter on the operator's shoulder is attached to the shoulder strap hook 16.

The bar handle 17 is one type of operating handle, made to extend transversely so as to be orthogonal from some point along the longitudinal direction of the narrow operating rod 11. The handle width is large because the bar handle 17 extends transversely from the operating rod 11. Therefore, the weed cutter 10 using the bar handle 17 is suitable for and widely used in weed cutting work in flat land, footpaths between rice fields, and various other terrains.

To give a detailed description, the bar handle 17 is formed into a shape substantially resembling a "U" in front view from a single round pipe composed of an aluminum alloy or another lightweight alloy. A middle part 17a in this U-shaped bar handle 17 is attached by a pipe handle holding structure 20 at some point along the longitudinal direction of the operating rod 11. In FIG. 1, the middle part 17a is offset (eccentrically disposed) upward on the operating rod 11. In the bar handle 17, grips 17b, 17c are attached to the respective distal ends of the portions extending to the left and right from the middle part 17a.

The operator positions the operating rod 11 so as to extend at a forward incline from his own torso, hangs the weed cutter 10 on his shoulder, holds the grips 17b, 17c of the bar handle 17 with both hands, and cuts weeds with the cutting blade 14 by moving the weed cutter vertically and laterally.

As described above, in the weed cutter 10 comprising the bar handle 17, the bar handle 17 extends in a direction substantially orthogonal to the narrow operating rod 11. Therefore, when the weed cutter 10 is stored, extra storage space is needed in proportion to the lateral extension of the bar handle 17. It is also preferable that the mounting angle of the bar handle 17 relative to the operating rod 11 be adjustable according to the operator's body type and the working condition of the weed cutter 10, in order to increase the working efficiency of the weed cutter 10.

Figure 2:
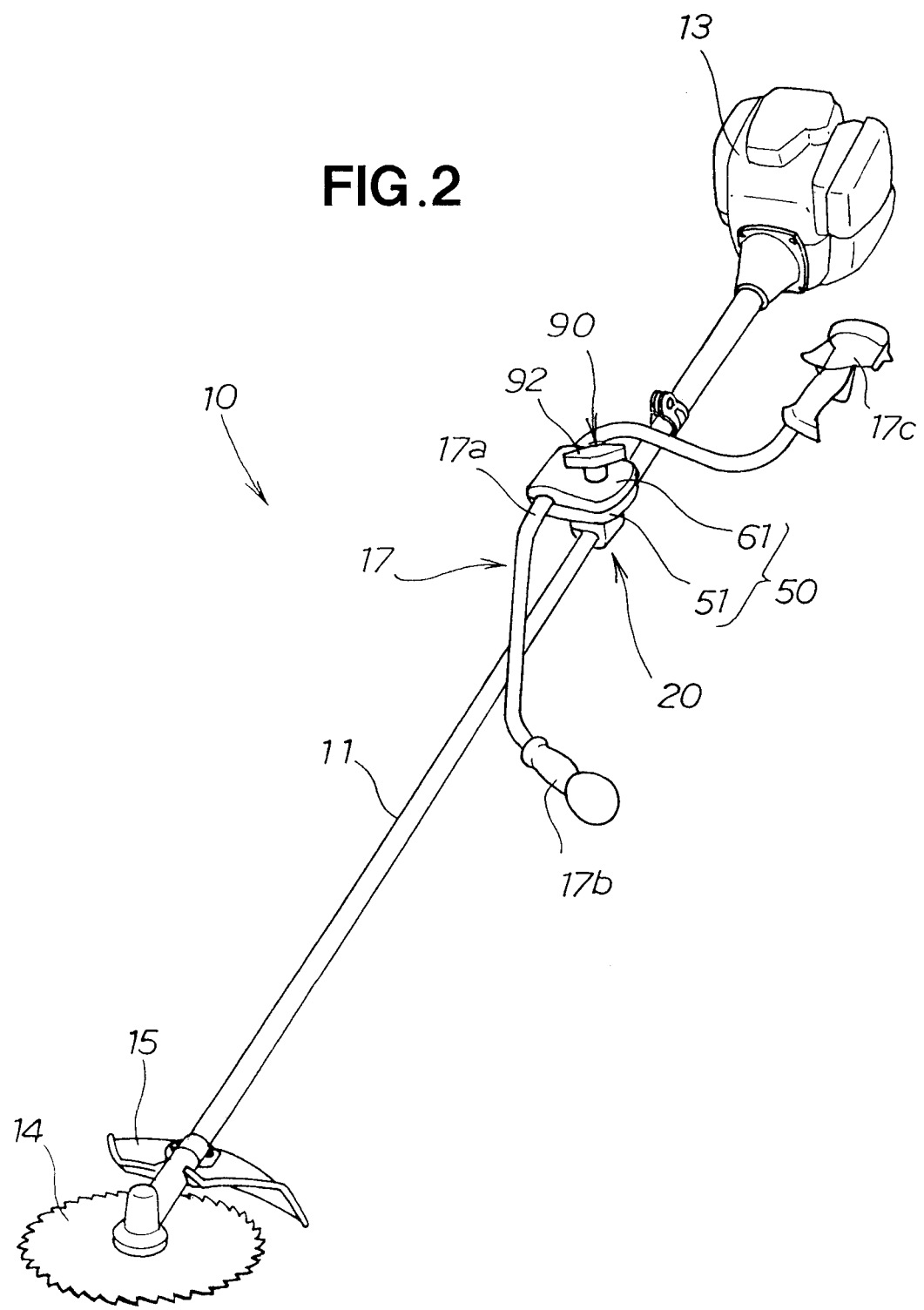
FIG. 2 is a perspective view showing an operation of the weed cutter of FIG. 1 set to a storage state.

The pipe handle holding structure 20 making it possible to change the mounting angle of the bar handle 17 relative to the operating rod 11 is thus used in the present invention. Therefore, when the weed cutter 10 is used, for example, the bar handle 17 is positioned substantially orthogonal to the operating rod 11 as shown in FIG. 1. When the weed cutter 10 is stored, the bar handle 17 is positioned substantially parallel to the operating rod 11 as shown in FIG. 2.

The pipe handle holding structure 20 is described hereinbelow with reference to FIGS. 3 through 5.

Figure 3:
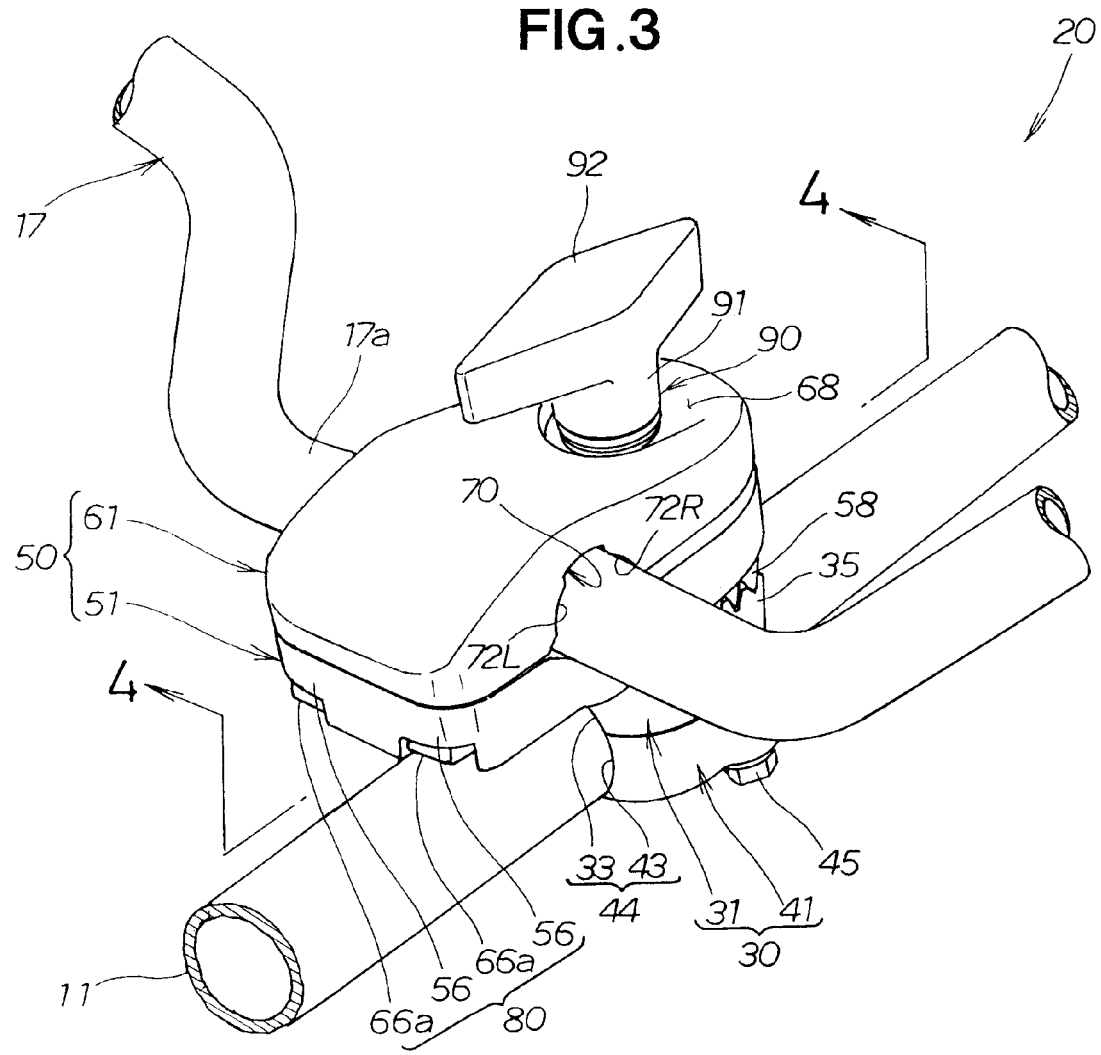
FIG. 3 is a perspective view showing the pipe handle holding structure of FIG. 1.
Figure 4:
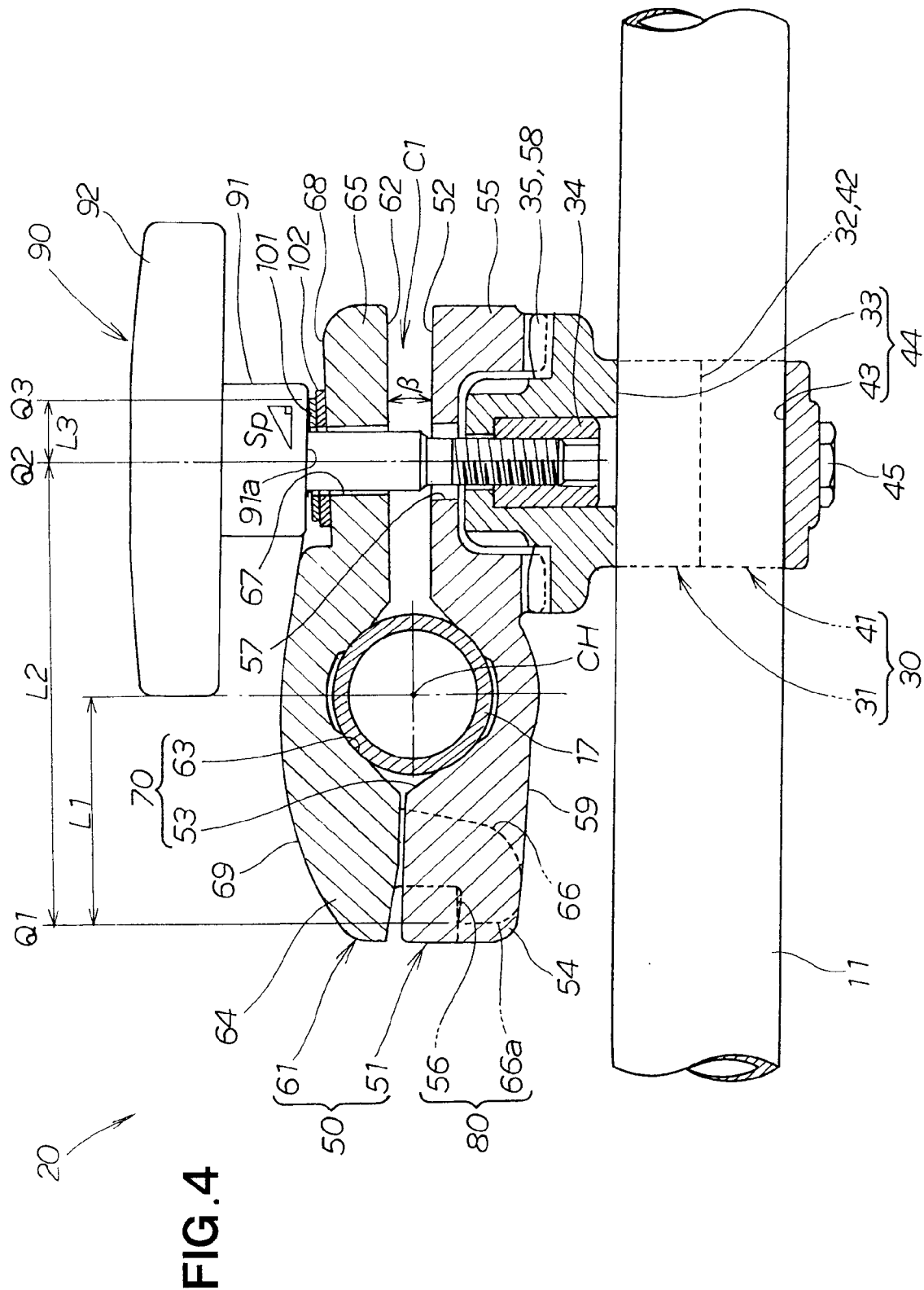
FIG. 4 is a cross-sectional view taken along line 4-4 of FIG. 3.
Figure 5:
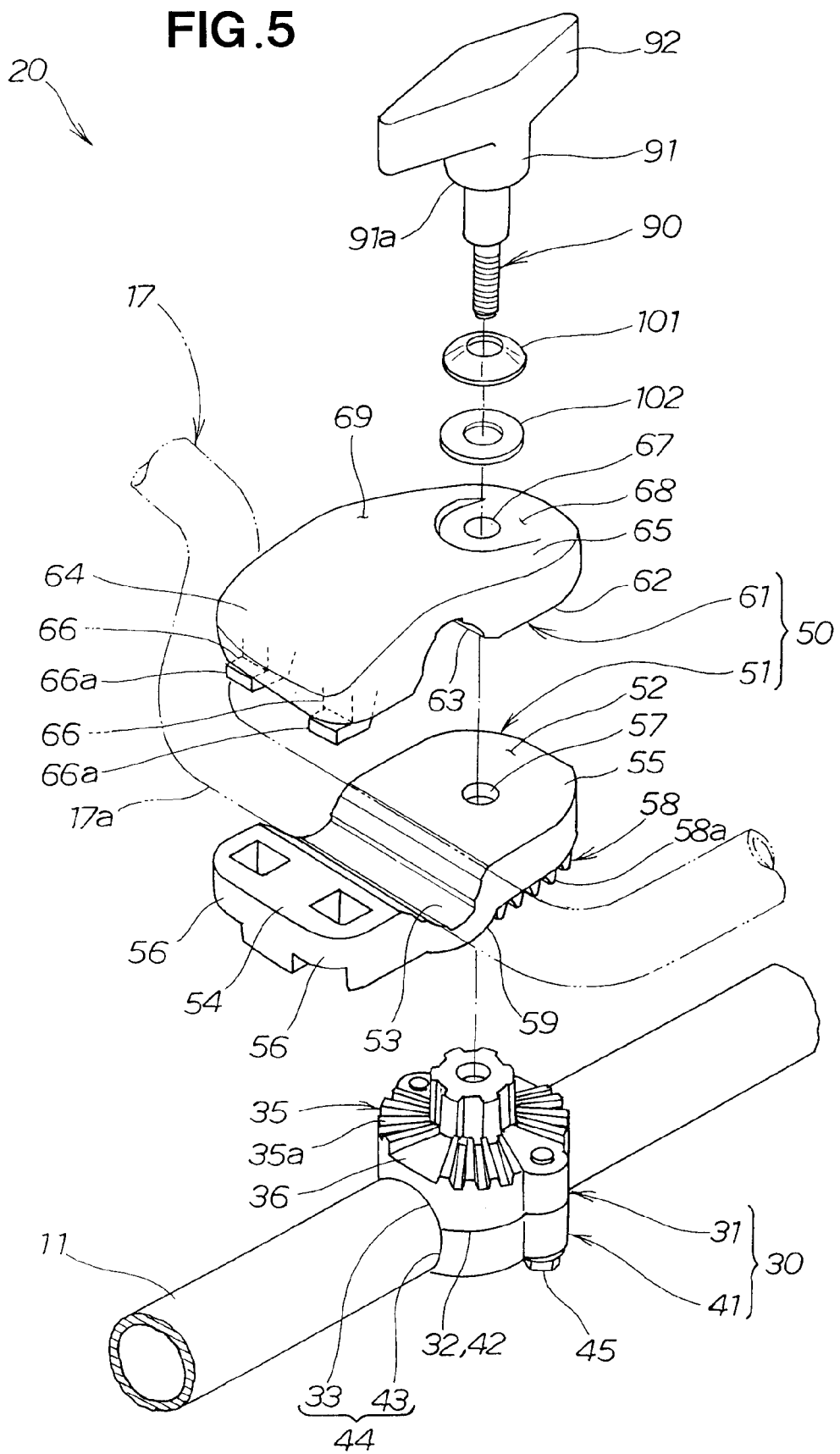
FIG. 5 is an exploded view illustrating the pipe handle holding structure of FIG. 4.

Referring to FIGS. 3 through 5, the pipe handle holding structure 20 is comprised of a mounting base 30 fixed to the operating rod 11, a holder 50 for holding the bar handle 17, and a locking bolt 90 for fixing the holder 50 to the mounting base 30. The locking bolt 90 is a knobbed fastening member having a knob 92 on a head 91. The mounting base 30 and the holder 50 are comprised of a die cast of an aluminum alloy or another lightweight alloy. Thus, the weed cutter 10 can be made lightweight by configuring the bar handle 17, the mounting base 30, and the holder 50 from a lightweight alloy.

The mounting base 30 is comprised of a pair of holder halves 31, 41 (base halves 31, 41) that has been divided into two halves. The pair of base halves 31, 41 has respective grooves 33, 43 recessed in directions opposite opposing surfaces 32, 42 which face each other. These grooves 33, 43 form a single through-hole 44 when the pair of base halves 31, 41 is joined together. The through-hole 44 is an operating rod insertion hole through which the operating rod 11 passes.

For the pair of base halves 31, 41 hereinbelow, the base half 31 on the side where the holder 50 is linked is referred to as the "first base half 31," and the base half 41 superposed on the first base half 31 is referred to as the "second base half 41."

The first base half 31 is comprised of a flat disc having a substantially circular shape when seen from the direction of the opposing surface 32, and the first base half 31 has the groove 33, a nut 34 (FIG. 4), and a toothed lock washer 35. The locking bolt 90 is threaded into the nut 34. The nut 34 is insert-formed into the first base half 31.

The toothed lock washer 35 is formed in the first base half 31 on a surface 36 (holder mounting surface 36) on side opposite the opposing surface 32, and is positioned concentrically with the nut 34. The toothed lock washer 35 is composed of a collection of a plurality of teeth 35a extending radially on the same surface and centered around the nut 34. These teeth 35a are formed in substantially trapezoidal shapes.

The second base half 41 is a flat disc having substantially the same shape as the first base half 31, and this base half has the groove 43. The groove 43 has the same configuration as the groove 33 of the first base half 31. The first and second base halves 31, 41 are superposed together, thereby sandwiching the operating rod 11 between the grooves 33, 43, and then the first and second base halves 31, 41 are clamped together by bolts 45, 45, thereby mounting the mounting base 30 to the operating rod 11 by friction.

The holder 50 is comprised of a pair of holder halves 51, 61 (holder halves 51, 61) that has been divided into two halves. These pair of holder halves 51, 61 has respective grooves 53, 63 recessed in directions opposite opposing surfaces 52, 62 which face each other. These respective grooves 53, 63 constitute a single through-hole 70 when the holder halves 51, 61 are joined together. The through-hole 70 constitutes a handle insertion hole through which the bar handle 17 passes. This through-hole 70 is hereinbelow appropriately referred to as a "handle insertion hole 70."

Furthermore, when the pair of holder halves 51, 61 encloses the external peripheral surface of the bar handle 17 as shown in FIG. 4, the opposing surfaces 52, 62 are separated from each other so as to have a gap C1 therebetween. With the center CH of the handle insertion hole 70 as a reference, the ends 54, 64 in the pair of holder halves 51, 61 are linked together by a hinge mechanism 80, and the other ends 55, 65 in the pair of holder halves 51, 61 are linked together by the locking bolt 90.

For the pair of holder halves 51, 61 hereinbelow, the one holder half 51 linked to the first base half 31 is referred to as the "first holder half 51," and the other holder half 61 superposed on the first holder half 51 is referred to as the "second holder half 61."

The first holder half 51 is comprised of a flat disc having a substantially rectangular shape when seen from the direction of the opposing surface 52, and this holder half has the groove 53, retaining convexities 56, 56, a bolt hole 57, and a toothed lock washer 58. The two retaining convexities 56, 56 are positioned are positioned on one end 54 of the first holder half 51, and the bolt hole 57 and toothed lock washer 58 are positioned on the other end 55 of the first holder half 51.

The bolt hole 57 is positioned concentrically with the first base half 31 and the nut 34. The bolt hole 57 runs in a direction orthogonal to the opposing surface 52, and the locking bolt 90 is passed through.

The toothed lock washer 58 meshes with the toothed lock washer 35 of the first base half 31. The toothed lock washer 58 is formed in the first holder half 51 on a surface 59 (base mounting surface 59) on the side opposite the opposing surface 52, and is positioned concentrically with the bolt hole 57. The toothed lock washer 58 of the first holder half 51 described above has the same configuration as the toothed lock washer 35 of the first base half 31. When the base mounting surface 59 of the first holder half 51 is superposed over the holder mounting surface 36 of the first base half 31 and the centers of the toothed lock washers 35, 58 are aligned together, the teeth 35a, 58a (FIG. 5) of the toothed lock washers 35, 58 mesh together.

The second holder half 61 is a flat disc having substantially the same shape as the first holder half 51, and the second holder half 61 has the groove 63, retaining arms 66, 66, and a bolt hole 67. The groove 63 has substantially the same configuration as the groove 53 of the first holder half 51. The two retaining arms 66, 66 are positioned on one end 64 of the second holder half 61, and the bolt hole 67 is positioned on the other end 65 of the second holder half 61.

The two retaining arms 66, 66 extend from the opposing surface 62 of the second holder half 61 toward the opposing surface 52 of the first holder half 51, and pawls 66a, 66a at the distal ends thereof catch on the retaining convexities 56, 56. The combined structure of the retaining convexities 56, 56 and the pawls 66a, 66a constitutes the hinge mechanism 80 (FIG. 3).

Thus, in the hinge mechanism 80, the ends 54, 64 in the first and second holder halves 51, 61 interlock by being fitted together. The position where the pawls 66a, 66a are retained on the retaining convexities 56, 56 is a swing center Q1, and the second holder half 61 opens and closes in relation to the first holder half 51. In other words, the second holder half 61 swings in relation to the first holder half 51, the swinging proximal end being the one end 64 linked by the hinge mechanism 80.

The bolt hole 67 has the same configuration as the bolt hole 57 of the first holder half 51, and the bolt hole 67 is positioned concentrically with the bolt hole 57.

The bolt hole 67 runs in a direction orthogonal to the opposing surface 62, and the locking bolt 90 is passed therethrough.

The second holder half 61 has a surface 68 (bearing surface 68) which is pressed toward the first holder half 51 by a pressing surface 91a in the head 91 of the locking bolt 90, as shown in FIG. 4. The bearing surface 68 is formed on a surface 69 on the side opposite the opposing surface 62. A plate washer 101 and a flat washer 102 are located between the bearing surface 68 and the pressing surface 91a of the head 91.

The bearing surface 68 is a surface inclined in relation to the pressing surface 91a in a state in which the external peripheral surface of the bar handle 17 is enclosed by the pair of holder halves 51, 61. The bearing surface 68 (inclined surface 68) is inclined at an inclination angle Sp so as to approach the pressing surface 91a of the head 91 as it moves away from the hinge mechanism 80.

FIG. 4 shows a state in which the pawls 66a, 66a are retained on the retaining convexities 56, 56 and the external peripheral surface of the bar handle 17 is enclosed by the pair of holder halves 51, 61. In this state, the opposing surface 62 of the second holder half 61 is inclined at a slight inclination angle $\beta$ in relation to the opposing surface 52 of the first holder half 51. This inclination angle $\beta$ causes the gap C1 between the opposing surfaces 52, 62 to be designed so as to be wider near the one end 64 than near the other end 65. This inclination angle $\beta$ is determined according to the size of the pipe diameter of the bar handle 17 relative to the diameter of the handle insertion hole 70. Preferably, the inclination angle $\beta$ is positioned so that the opposing surface 62 of the second holder half 61 is substantially parallel to the opposing surface 52 of the first holder half 51 when the external peripheral surface of the bar handle 17 is enclosed by the pair of holder halves 51, 61 and elastically deformed by a fixed amount in the pipe diameter direction.

The bearing surface 68 is designed so as to be parallel to the opposing surface 62 of the second holder half 61. As a result, the bearing surface 68 is inclined by an inclination angle Sp so that the side near the other end 65 is nearer to the pressing surface 91a than the side near the one end 64.

The bearing surface 68 may also be slightly inclined in relation to the opposing surface 62 of the second holder half 61. The bearing surface 68 in this case is designed so that the side near the other end 65 is higher than the side near the one end 64. As a result, the bearing surface 68 is inclined by an inclination angle Sp so that the side near the other end 65 is nearer to the pressing surface 91a than the side near the one end 64.

The following is a description, made with reference to FIGS. 4 and 5, of the procedure for mounting the holder 50 and the bar handle 17 on the mounting base 30 which is mounted to the operating rod 11.

First, the middle part 17a of the bar handle 17 is fitted into the groove 53 of the first holder half 51.

Next, the retaining arms 66, 66 are retained on the retaining convexities 56, 56, the portions retained together are used as hinges to swing the second holder half 61, and the opposing surfaces 52, 62 of the first and second holder halves 51, 61 are joined together so as to face each other. As a result, the middle part 17a of the bar handle 17 is enclosed in the grooves 53, 63 of the first and second holder halves 51, 61.

The toothed lock washer 58 of the first holder half 51 is positioned in and meshed with the toothed lock washer 35 of the first base half 31.

The locking bolt 90 is passed through the bolt holes 67, 57 and threaded through the nut 34 (FIG. 4). The operator can tighten or loosen the locking bolt 90 by turning the knob 92 by hand. The operation of mounting the holder 50 and the bar handle 17 is thereby complete.

Next, the procedure of adjusting the mounting angle of the bar handle 17 relative to the operating rod 11 will be described.

First, the locking bolt 90 is loosened.

The holder 50 is moved in a direction whereby the toothed lock washer 58 of the first holder half 51 is released from being meshed with the toothed lock washer 35 of the first base half 31.

The mounted angle of the bar handle 17 relative to the operating rod 11 can be adjusted as desired.

The toothed lock washer 58 of the first holder half 51 is made to mesh with the toothed lock washer 35 of the first base half 31.

Lastly, the locking bolt 90 is tightened. The operation of adjusting the mounting angle is thereby complete.

Next, the handle insertion hole 70 will be described with reference to FIGS. 6 through 8.

Figure 7:
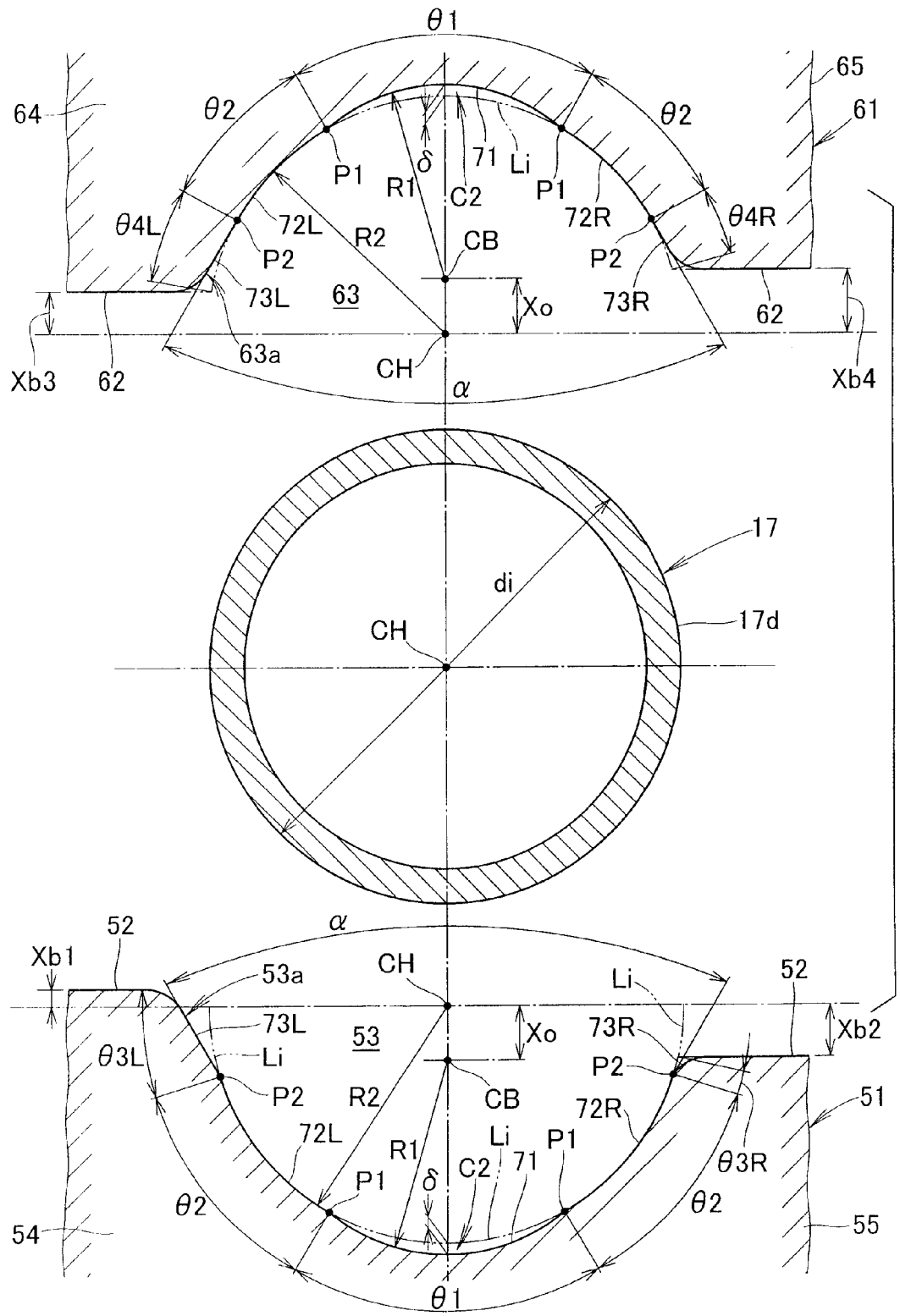
FIG. 7 is an exploded view of the handle insertion hole and the bar handle of FIG. 6.

In the opposing surface 52 of the first holder half 51, the side at the one end 54 of the first holder half 51 protrudes farther toward the second holder half 61 than the center CH of the handle insertion hole 70 by a first distance Xb1, as shown in FIG. 7. Also in the opposing surface 52 of the first holder half 51, the side at the other end 55 of the first holder half 51 is withdrawn from the center CH toward the bottom of the groove 53 by a second distance Xb2.

The groove 53 of the first holder half 51 is formed into a substantially semicircular cross section, and is composed of an inside surface 53a whose essential shape is a reference circle Li shown by an imaginary line. The reference circle Li is a true circle having a radius R2, its reference being the center CH of the handle insertion hole 70. Using di to denote the pipe diameter of the bar handle 17 comprised of a substantially true circular round pipe, the radius R2 is slightly greater than ½ the pipe diameter di (R2>di/2). Preferably, the radius R2 is a value greater than di/2 by 0.1 to 0.2 mm.

The inside surface 53a of the groove 53 has a continuous configuration consisting of a bottom surface 71 positioned diametrically outside of the reference circle Li, left and right side surfaces 72L, 72R positioned on the reference circle Li, and left and right edge surfaces 73L, 73R positioned diametrically outside of the reference circle Li.

The bottom surface 71 is a circular surface at the deepest location of the groove 53, and is formed into an arcuate shape having a radius R1 whose reference is a center CB. The radius R1 is slightly less than ½ the pipe diameter di (R1<di/2). Preferably, the radius R1 is a value less than di/2 by 1 to 2 mm. Thus, the relationship is "R2>di/2>R1." A predetermined gap C2 is formed between the reference circle Li and the bottom surface 71. The size δ of this gap C2 is designed to be 0.1 to 0.5 mm in the largest portion. Therefore, the center CB as the reference of the radius R1 is offset from the center CH of the handle insertion hole 70 (the center CH as the reference of the radius R2) by a distance Xo toward the bottom surface 71. The range of the bottom surface 71 (the range between the left and right end points P1, P1) is an angle θ, whose reference is the center CH of the handle insertion hole 70.

The paired left and right side surfaces 72L, 72R are arcuate surfaces facing the opposing surface 52 from the left and right end points P1, P1 in the bottom surface 71, and are formed into circular shapes of a radius R2 whose reference is the center CH of the handle insertion hole 70. With the center CH as a reference, the ranges of the left side surface 72L and the right side surface 72R (the range from a point P1 to a point P2) are both an angle θ2.

The paired left and right edge surfaces 73L, 73R are flat surfaces formed from the left and right end points P2, P2 in the left and right side surfaces 72L, 72R up to the opposing surface 52, and are made to open diametrically outward in relation to the reference circle Li. The opening angle α formed by the pair of edge surfaces 73L, 73R is an acute angle, and is set to 60° to 70°, for example. Using the center CH as a reference, the range of the left edge surface 73L (the range from the point P2 to the opposing surface 52) is an angle θ3L and the range of the right edge surface 73R (the range from the point P2 to the opposing surface 52) is an angle θ3R.

In the opposing surface 62 of the second holder half 61, the side on the one end 64 of the second holder half 61 is withdrawn from the center CH toward the bottom of the groove 63 by a third distance Xb3, as shown in FIG. 7. In the opposing surface 62 of the second holder half 61, the side on the other end 65 of the second holder half 61 is withdrawn from the center CH toward the bottom of the groove 63 by a fourth distance Xb4. The fourth distance Xb4 is greater than the third distance Xb3 (Xb3<Xb4).

The groove 63 of the second holder half 61 is formed into a substantial semicircle in cross section, similar to the groove 53 of the first holder half 51, and is composed of an inside surface 63a whose essential shape is the reference circle Li shown by the imaginary line. The inside surface 63a of the groove 63 has a continuous configuration consisting of a bottom surface 71 positioned diametrically outside of the reference circle Li, left and right side surfaces 72L, 72R positioned on the reference circle Li, and left and right edge surfaces 73L, 73R positioned diametrically outside of the reference circle Li.

The bottom surface 71 has the same configuration as the bottom surface 71 in the first holder half 51. The pair of left and right side surfaces 72L, 72R has the same configuration as the left and right side surfaces 72L, 72R in the first holder half 51. The pair of left and right edge surfaces 73L, 73R has substantially the same configuration as the left and right edge surfaces 73L, 73R in the first holder half 51. Using the center CH as a reference, the range of the left edge surface 73L (the range from the point P2 to the opposing surface 62) is an angle θ4L, and the range of the right edge surface 73R (the range from the point P2 to the opposing surface 62) is an angle θ4R. The right angle θ4R is less than the left angle θ4L (θ4L>θ4R).

The bottom surface 71 and the pair of left and right edge surfaces 73L, 73R are appropriately referred to as "pipe-outward deformation-allowing parts 71, 73L, 73R," and the pair of left and right side surfaces 72L, 72R is appropriately referred to as "enclosing parts 72L, 72R."

Figure 8:
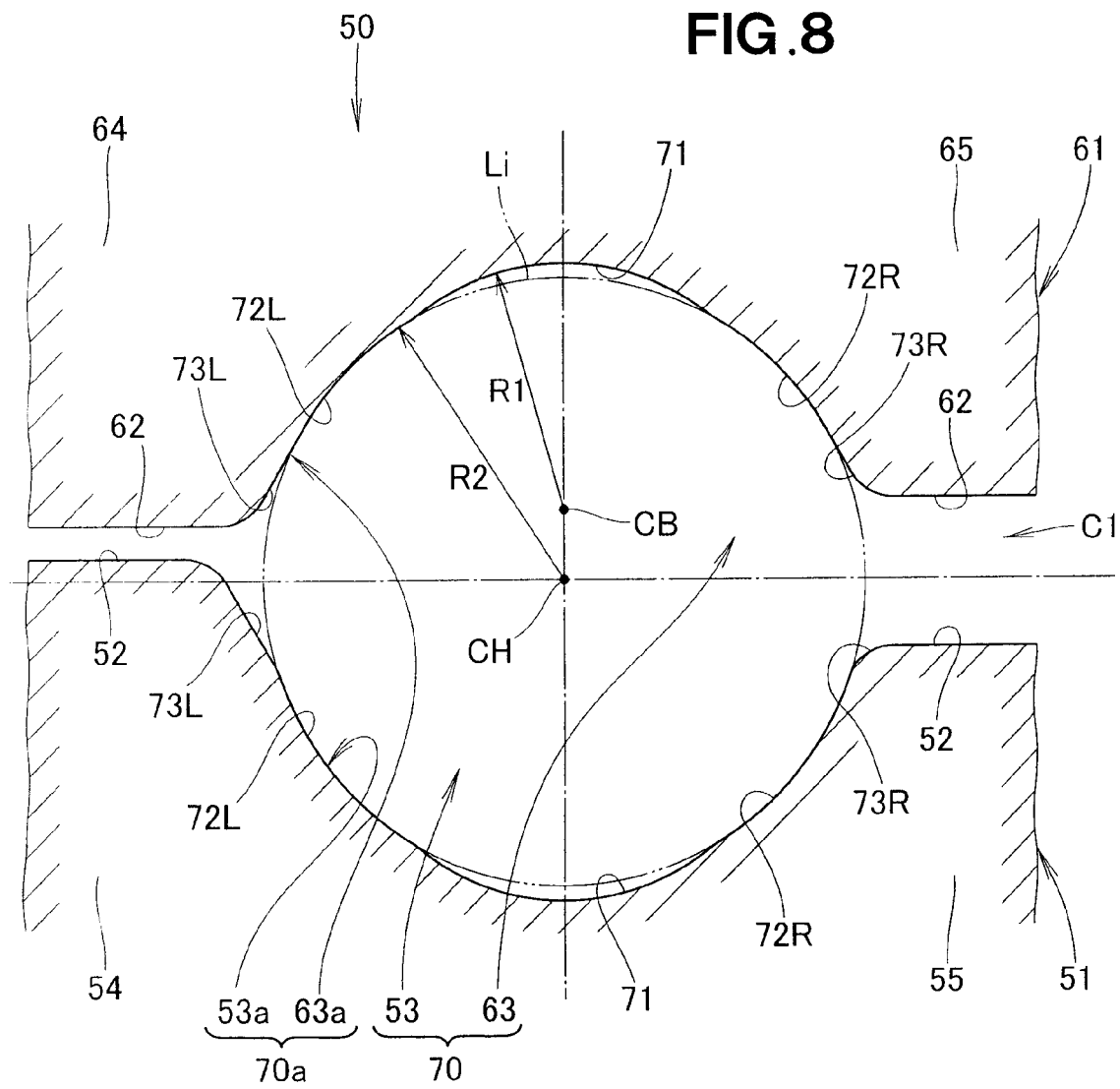
FIG. 8 is a schematic view showing the bar handle removed from the handle insertion hole of FIG. 6.

The holder 50 has a plurality of enclosing parts 72L, 72R and a plurality of pipe-outward deformation allowing parts 71, 73L, 73R on the internal peripheral surface 70a (the grooves 53, 63 and the inside surfaces 53a, 63a) of the handle insertion hole 70, as shown in FIG. 8.

Figure 6:
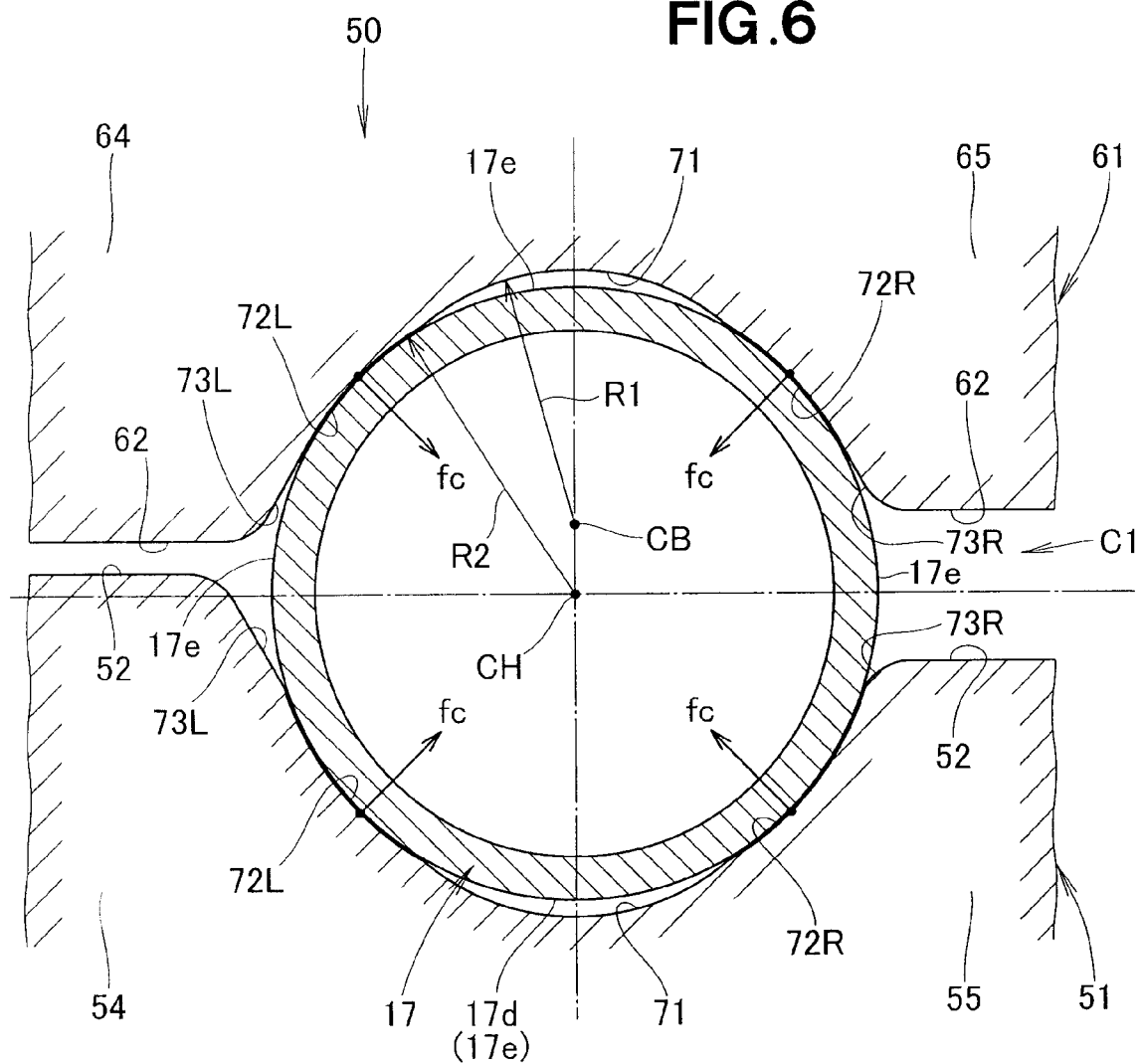
FIG. 6 is a cross-sectional view showing on an enlarged scale a handle insertion hole and a bar handle of FIG. 4.

The enclosing parts 72L, 72R are portions which enclose the external peripheral surface 17d in the round pipe-shaped bar handle 17 and which are capable of elastically deforming the bar handle in the pipe diameter direction, as shown in FIGS. 6 through 8. Specifically, when the first and second holder halves 51, 61 are manually fastened together by the locking bolt 90 (see FIG. 4), the enclosing parts 72L, 72R elastically deform the bar handle 17 in the pipe diameter direction (for example, toward the center CH of the handle insertion hole 70) in accordance with the fastening force.

As described above, in the inside surface 53a of the groove 53 of the first holder half 51 the left enclosing part 72L and the right enclosing part 72R are positioned so that the pipe-outward deformation-allowing part 71 is located therebetween (creating an interval of an angle θ1. In the inside surface 63a of the groove 63 of the second holder half 61, the left enclosing part 72L and the right enclosing part 72R are positioned so that the pipe-outward deformation-allowing part 71 is located therebetween (creating an interval of an angle θ1). Therefore, the enclosing parts 72L, 72R are positioned in the internal peripheral surface 70a of the handle insertion hole 70 so as to create a predetermined interval in the internal peripheral direction; i.e., an interval of an angle θ1.

The pipe-outward deformation allowing parts 71, 73L, 73R are the remaining portions in the internal peripheral surface 70a of the handle insertion hole 70 where the enclosing parts 72L, 72R are not positioned. In other words, the pipe-outward deformation allowing parts 71, 73L, 73R are portions formed so as to allow the portion 17e (see FIG. 6) not enclosed in the bar handle 17 to elastically deform diametrically outward when the bar handle 17 is enclosed and elastically deformed diametrically inward by the enclosing parts 72L, 72R.

The action of the configuration described above is as follows.

In the present embodiment, the grooves 53, 63 face each other when the first and second holder halves 51, 61 are joined together, as shown in FIG. 8. Orienting the grooves 53, 63 towards each other causes the handle insertion hole 70 to be formed in the holder 50. The enclosing parts 72L, 72R are positioned on the internal peripheral surface 70a of the handle insertion hole 70 at predetermined intervals (the angles θ1 shown in FIG. 7) in the internal peripheral direction. The bar handle 17 (FIG. 6) through which the handle insertion hole 70 is passed is enclosed by the enclosing parts 72L, 72R. In other words, when the joined first and second holder halves 51, 61 are manually fastened together by the locking bolt 90 (FIG. 4), the external peripheral surface 17d of the bar handle 17 is enclosed by the enclosing parts 72L, 72R, as shown in FIG. 6. The enclosing force at this time is fc. As a result, the enclosing parts 72L, 72R can cause the bar handle 17 to elastically deform in the pipe diameter direction in accordance with the fastening force of the locking bolt 90. Thus, the bar handle 17 can be reliably held by a holder 50 having a simple configuration merely in which the grooves 53, 63 are formed respectively in the first and second holder halves 51, 61.

As is made clear in the above description, in the pipe handle holding structure of the present embodiment, the external peripheral surface 17d in the round pipe-shaped bar handle 17 is enclosed by the enclosing parts 72L, 72R and made to elastically deform in the pipe diameter direction. When the external peripheral surface 17d of the bar handle 17 is enclosed by the enclosing parts 72L, 72R, the round pipe-shaped cross section in the bar handle 17 deforms to a somewhat distorted shape (hereinbelow referred to as an "elastically deformed state") in accordance with the enclosing force fc. When the enclosing is then released, the round pipe-shaped cross section in the bar handle 17 returns to its original shape. While the round pipe-shaped cross section remains elastically deformed, the elastically deformed portion in the external peripheral surface 17d of the bar handle 17 can be kept in an enclosed state by the enclosing parts 72L, 72R. Therefore, the external peripheral surface 17d of the bar handle 17 does not slip relative to the enclosing parts 72L, 72R. As a result, the holding performance of the holder 50 can be improved and a sufficiently reliable hold can be maintained, because the bar handle 17 can be constantly and reliably held by the holder 50.

In a conventional pipe handle holding structure, a large fastening force has been required in cases in which the external peripheral surface of the bar handle is held by friction against the inside surface of the holder.

In the present embodiment, since the external peripheral surface 17d of the bar handle 17 is enclosed and made to elastically deform in the pipe diameter direction by the enclosing parts 72L, 72R, a comparatively small force is sufficient for holding the bar handle 17 in the holder 50.

Moreover, the present embodiment has a so-called multipoint contact configuration in which only the enclosing parts 72L, 72R come in contact with the external peripheral surface 17d of the round pipe-shaped bar handle 17. Therefore, the bar handle 17 can be held by the holder 50 in a reliable and stable manner even in cases in which the round pipe has low roundness (the degree of true circularity is low).

Furthermore, since the external peripheral surface 17d of the bar handle 17 is merely enclosed by the enclosing parts 72L, 72R and made to elastically deform in the pipe diameter direction, the bar handle 17 and the holder 50 can be constantly maintained in an appropriate state even if the operation of attaching and detaching the bar handle 17 to and from the holder 50 is frequently repeated.

Furthermore, in the present embodiment, the remaining portions in the internal peripheral surface 70a of the handle insertion hole 70, where the enclosing parts 72L, 72R are not located, become the pipe-outward deformation allowing parts 71, 73L, 73R.

Commonly, the circumferential length of the pipe does not change from its original length prior to deformation even when the bar handle 17 elastically deforms radially inwardly of the pipe. Therefore, in cases in which the bar handle 17 is enclosed by the enclosing parts 72L, 72R and is made to elastically deform radially inwardly of the pipe, the portion 17e not enclosed acts as though to expand radially outwardly of the pipe. In other words, this portion acts as though to elastically deform farther radially outwardly of the pipe than the internal peripheral surface 70a of the handle insertion hole 70.

In response to this, in the present embodiment, the internal peripheral surface 70a of the handle insertion hole 70 is provided with the pipe-outward deformation allowing parts 71, 73L, 73R so as to allow for the portions acting as though to protrude farther diametrically outward than the internal peripheral surface 70a of the handle insertion hole 70. Therefore, the portion 17e not enclosed by the enclosing parts 72L, 72R is not restricted by the handle insertion hole 70 and can protrude radially outwardly of the pipe. Consequently, the bar handle 17 can be enclosed by the enclosing parts 72L, 72R and can be more easily made to elastically deform radially outwardly of the pipe.

Furthermore, in the present embodiment, the bar handle 17 and the holder 50 are created from an aluminum alloy or another lightweight alloy. Therefore, a small amount of force is sufficient for elastically deforming the bar handle 17 by a predetermined amount in the pipe diameter direction, in comparison with cases in which a bar handle made of steel is used. Furthermore, since the pipe handle holding structure 20 has a configuration in which the external peripheral surface 17d of the bar handle 17 is enclosed by the enclosing parts 72L, 72R and made to elastically deform in the pipe diameter direction, the structure is considerably more durable than a conventional pipe handle holding structure which uses friction force or a pipe handle holding structure provided with serrations or other irregularities, regardless of whether or not the bar handle 17 and the holder 50 are created from an aluminum alloy or another lightweight alloy in order to reduce weight.

The one set of ends 54, 64 of the first and second holder halves 51, 61 are linked together by the hinge mechanism 80, as shown in FIG. 4. Therefore, the second holder half 61 swings relative to the first holder half 51, the swinging proximal end being the one end 64 linked by the hinge mechanism 80.

The other set of ends 55, 65 of the first and second holder halves 51, 61 are linked together by the locking bolt 90. When the locking bolt 90 is fastened in a state in which the external peripheral surface 17d (see FIG. 6) of the bar handle 17 is enclosed by the first and second holder halves 51, 61, the pressing surface 91a of the head 91 presses the bearing surface 68 in the second holder half 61 toward the first holder half 51.

At this time, the balance of force in the second holder half 61 can be said to be the same as the balance of force in a so-called cantilever. As described above, in the second holder half 61, the position where the pawl 66a is retained on the retaining convexity 56 is the swing center Q1 of the second holder half 61. This swing center Q1 is also the position of the one end 64 linked to the hinge mechanism 80.

The distance L1 from the swing center Q1 (the end of the position of the one end 54) to the position where the external peripheral surface 17d of the bar handle 17 is enclosed (the center CH of the handle insertion hole 70) is referred to as the "first distance L1." The distance L2 from the swing center Q1 to the position Q2 (center Q2 of the bolt) where the bearing surface 68 is pressed by the pressing surface 91a of the head 91 is referred to as the "second distance L2." The second distance L2 is greater than the first distance L1. Therefore, the force whereby the external peripheral surface 17d of the bar handle 17 is enclosed by the first and second holder halves 51, 61 is strong even if the force whereby the locking bolt 90 is fastened is small. In other words, a comparatively small force is sufficient for turning the knob 92 in order for the external peripheral surface 17d of the bar handle 17 to be enclosed by the enclosing parts 72L, 72R and elastically deformed in the pipe diameter direction. Therefore, the operator's load can be reduced.

Furthermore, the bearing surface 68 is inclined so as to approach the pressing surface 91a of the head 91 as it moves away from the hinge mechanism 80. Therefore, the position where the pressing surface 91a of the head 91 presses the bearing surface 68 is even farther from the hinge mechanism 80. The distance L3 from the center Q2 of the locking bolt 90 to the position Q3 where the pressing surface 91a of the head 91 presses the bearing surface 68 is referred to as the "third distance L3." The distance from the swing center Q1 to the position Q3 pressed by the pressing surface 91a of the head 91 is even greater, being equivalent to the second distance L2 and the third distance L3 combined. Consequently, even less force is sufficient for turning the knob 92, and the operator's load can therefore be reduced even further.

Figure 9:
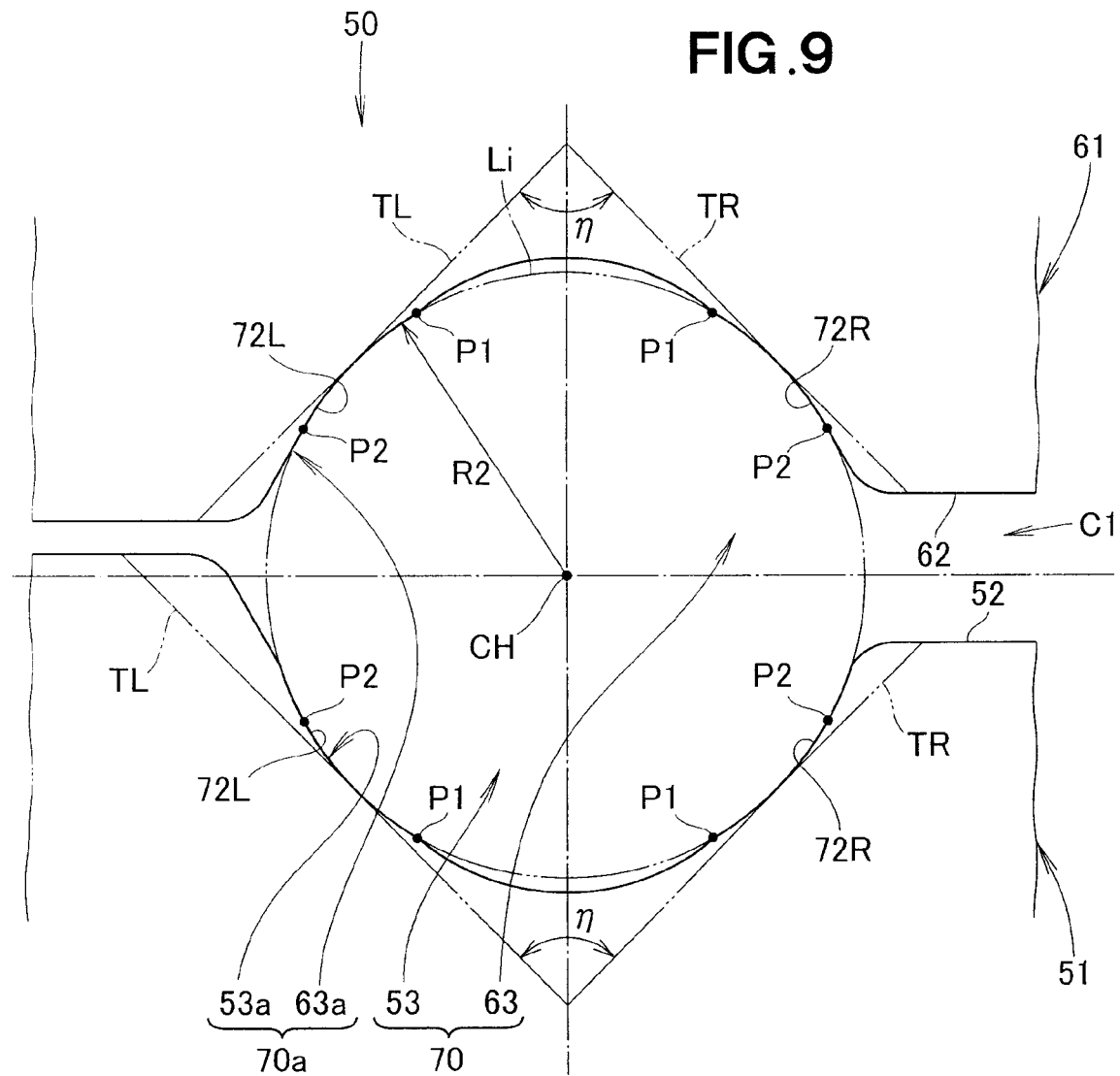
FIG. 9 is a schematic view of the handle insertion hole of FIG. 8.

Next, the grooves 53, 63 forming the handle insertion hole 70 are considered from another viewpoint. As described above, the grooves 53, 63 are formed into substantial semicircles in cross section. FIG. 9 is a schematic drawing of the handle insertion hole shown in FIG. 8, wherein the lines of contact TL with the left enclosing part 72L and the lines of contact TR with the right enclosing part 72R are shown by imaginary lines. The left and right contact lines TL, TR are preferably in contact respectively with the left and right enclosing parts 72L, 72R at the center positions between points P1 and points P2.

The left and right contact lines TL, TR are inclined in mutually opposite directions, and are inclined in relation to the opposing surfaces 52, 62 of the first and second holder halves 51, 61. As a result, the left and right contact lines TL, TR have tapered shapes; i.e., substantially V-shaped configurations, which taper off in directions opposite the opposing surfaces 52, 62 in the first and second holder halves 51, 61. The opening angles η formed by the left and right contact lines TL, TR are substantially 90°. Thus, the grooves 53, 63 have inside surfaces 53a, 63a where the left and right contact lines TL, TR are in contact with the left and right enclosing parts 72L, 72R. Consequently, the grooves 53, 63 can be regarded to be a type of cross-sectionally tapering grooves that taper in directions opposite the opposing surfaces 52, 62 which face each other.

Based on this point, the grooves 53, 63 can have the configuration in the following modification.

The inside surfaces 53a, 63a in the grooves 53, 63 of the modification are composed of surfaces (groove surfaces) inclined so as to match up with the left and right contact lines TL, TR, as shown in FIG. 9. As a whole, the inside surfaces 53a, 63a inclined so as to match up with the left and right contact lines TL, TR fulfill the role of the enclosing parts 72L, 72R in the embodiment described above. In other words, the respective inclined groove surfaces for forming the grooves 53, 63 constitute the enclosing parts. Thus, the grooves 53, 63 of the modification are formed into tapered shapes so as to taper off from the opposing surfaces 52, 62 facing each other towards surfaces 59, 69 (FIG. 4) on the opposite sides in the first and second holder halves 51, 61.

The modification is summarized as follows.

The first and second holder halves 51, 61 have grooves 53, 63 substantially tapered in cross section, i.e., substantially V-shaped grooves 53, 63 which taper in directions opposite the opposing surfaces 52, 62 facing each other. The inclined groove surfaces TL, TR for forming these grooves 53, 63 constitute a plurality of concealing parts. The groove surfaces TL, TR inclined so as to match up with the left and right contact lines TL, TR in the inside surfaces 53a, 63a of the grooves 53, 63 of the modification are hereinbelow referred to as "the plurality of concealing parts TL, TR."

When the first and second holder halves 51, 61 are joined together, the substantially V-shaped grooves 53, 63 face each other. Causing these grooves 53, 63 to face each other forms a substantially square through-hole 70 (the handle insertion hole 70 through which the bar handle 17 shown in FIG. 6 passes) in the holder 50. The bar handle 17 passing through the handle insertion hole 70 is enclosed by the four sides TL, TR (enclosing parts TL, TR) in the square-shaped handle insertion hole 70. In other words, when the joined first and second holder halves 51, 61 are manually fastened together by the locking bolt 90 (FIG. 4), the external peripheral surface 17d of the bar handle 17 is enclosed by the enclosing parts TL, TR at four points along the pipe circumferential direction. As a result, the four enclosing parts TL, TR can cause the bar handle 17 to elastically deform in the pipe diameter direction in accordance with the fastening force of the locking bolt 90.

Thus, in the modification, the bar handle 17 can be reliably held by the holder 50, which has a simple configuration in which merely the grooves 53, 63, having substantially tapered shapes in cross section, are formed respectively in the first and second holder halves 51, 61. Moreover, the same action and effects as those of the embodiment described above are exhibited.

In the present invention, the pipe handle holding structure 20 is not limited to a configuration for holding a bar handle in a weed cutter or another work machine, and can also be applied to a common vehicle, for example.

The pipe handle holding structure 20 of the present invention is suitable for attaching the bar handle 17 to the operating rod 11 in the weed cutter 10.

Obviously, various minor changes and modifications of the present invention are possible in light of the above teaching. It is therefore to be understood that within the scope of the appended claims the invention may be practiced otherwise than as specifically described.

What is claimed is:

1. A pipe handle holding structure comprising:
a round pipe-shaped bar handle, said bar handle having a radius; and
a holder for holding an external peripheral surface of the bar handle,
wherein the holder has a plurality of enclosing parts for enclosing the external peripheral surface of the bar handle and causing the bar handle to elastically deform in a pipe diameter direction, wherein
the holder is divided into two holder halves, each of the holder halves including some of said plurality of enclosing parts,
the holder halves have respective grooves recessed from opposed surfaces thereof in directions opposite the opposed surfaces,
the grooves, when the holder halves are mated together, define a single through-hole that serves as a handle insertion hole for allowing passage of the bar handle, wherein the internal peripheral surface of the handle insertion hole comprises bottom surfaces of the two holder halves,
the enclosing parts are positioned on an internal peripheral surface of the handle insertion hole at predetermined intervals in an internal peripheral direction and are formed with a radius of curvature that is between 0.1 and 0.2 mm greater than the radius of the bar handle in an undeformed state, and
when the mated holder halves are manually fastened by a knobbed fastening member, the bar handle is elastically deformed in a pipe diameter direction in accordance with the fastening force, and
the bottom surfaces of the two holder halves include pipe-outward-deformation allowing parts at portions where the enclosing parts are not positioned, the pipe-outward-deformation allowing parts bottom surfaces being formed with a radius of curvature that is between 1 mm to 2 mm less than the radius of the bar handle in the undeformed state, said pipe-outward-deformation allowing parts allowing unenclosed portions of the bar handle to elastically deform diametrically outward when the bar handle is enclosed and fully clamped by the enclosing parts and elastically deforms radially inwardly, and the bar handle as a whole elastically deforms into a distorted configuration, partly compressed and partly elongated, in a pipe diameter direction.

2. The holding structure of claim 1, wherein
the holder halves are configured such that with the external peripheral surface of the bar handle being enclosed, the opposed surfaces are separated from each other by a gap,
the holder halves are linked to each other at one ends by a hinge mechanism and at opposite ends by the knobbed fastening member, the knobbed fastening member being comprised of a bolt having a knob on a head,
one of the holder halves has a bearing surface pressed toward an other one of the holder halves by a pressing surface in the head, the bearing surface being configured as an inclined surface in relation to the pressing surface in a state in which the external peripheral surface of the bar handle is enclosed by the holder halves, and
the inclined surface is configured to be set at an incline so as to approach the pressing surface as the inclined surface moves away from the hinge mechanism.

3. A pipe handle holding structure comprising:
a round pipe-shaped bar handle, said bar handle having a radius; and
a holder for holding an external peripheral surface of the bar handle,
wherein the holder has a plurality of enclosing parts for enclosing the external peripheral surface of the bar handle and causing the bar handle to elastically deform in a pipe diameter direction, wherein
the holder is divided into two holder halves, each of the holder halves including some of said plurality of enclosing parts,
the holder halves have respective cross-sectionally tapered grooves tapering from opposed surfaces thereof in directions opposite the opposed surface,
the grooves, when the holder halves are mated together, form a single through-hole that serves as a handle insertion hole for allowing passage of the bar handle, wherein the internal peripheral surface of the handle insertion hole comprises bottom surfaces of the two holder halves,
respective inclined groove surfaces defining the grooves constitute the enclosing parts, and
the enclosing parts are formed with a radius of curvature that is between 0.1 to 0.2 mm greater than the radius of the bar handle in an undeformed state so that when the mated holder halves are manually fastened by a knobbed fastening member, the bar handle is elastically deformed in the pipe diameter direction in accordance with a fastening force, and
the bottom surfaces of the two holder halves include pipe-outward-deformation allowing parts at portions where the enclosing parts are not positioned, the pipe-outward-deformation allowing parts bottom surfaces being formed with a radius of curvature that is between 1 mm to 2 mm less than the radius of the bar handle in the undeformed state, said pipe-outward-deformation allowing parts allowing unenclosed portions of the bar handle to elastically deform diametrically outward when the bar handle is enclosed and fully clamped by the enclosing parts and elastically deforms radially inwardly, and the bar handle as a whole elastically deforms into a distorted configuration, partly compressed and partly elongated, in a pipe diameter direction.

4. The holding structure of claim 3, wherein
the holder halves are configured such that with the external peripheral surface of the bar handle being enclosed, the opposed surfaces are separated from each other by a gap,
the holder halves are linked to each other at one ends by a hinge mechanism and at opposite ends by the knobbed fastening member, the knobbed fastening member being comprised of a bolt having a knob on a head,
one of the holder halves has a bearing surface pressed toward an other one of the holder halves by a pressing surface in the head, the bearing surface being configured as an inclined surface in relation to the pressing surface with the external peripheral surface of the bar handle being enclosed by the holder halves, and
the inclined surface is configured so as to be inclined so as to approach the pressing surface as the inclined surface moves away from the hinge mechanism.

* * * * *